(12) United States Patent
Garver

(10) Patent No.: US 9,988,141 B2
(45) Date of Patent: Jun. 5, 2018

(54) FLUID INTERFACE DEVICE AND METHOD

(75) Inventor: Theodore M. Garver, Springboro, PA (US)

(73) Assignee: Ecological Energy Company, Canfield, OH (US)

( * ) Notice: Subject to any disclaimer, the term of this patent is extended or adjusted under 35 U.S.C. 154(b) by 929 days.

(21) Appl. No.: 13/814,658

(22) PCT Filed: Aug. 6, 2011

(86) PCT No.: PCT/US2011/046877
§ 371 (c)(1),
(2), (4) Date: Feb. 6, 2013

(87) PCT Pub. No.: WO2012/019179
PCT Pub. Date: Feb. 9, 2012

(65) Prior Publication Data
US 2013/0142663 A1 Jun. 6, 2013

Related U.S. Application Data

(60) Provisional application No. 61/371,205, filed on Aug. 6, 2010.

(51) Int. Cl.
*B64C 23/02* (2006.01)
*B64C 23/06* (2006.01)
*F03D 1/06* (2006.01)

(52) U.S. Cl.
CPC ............. *B64C 23/02* (2013.01); *B64C 23/06* (2013.01); *F03D 1/0633* (2013.01); *F03D 1/0675* (2013.01); *Y10T 29/49826* (2015.01)

(58) Field of Classification Search
CPC ...... F03D 1/0633; F03D 1/0675; F04D 29/68; F01D 9/02; B64C 23/02; B64C 23/06; B64C 23/08; B64C 2003/148
USPC .......................................................... 415/914
See application file for complete search history.

(56) References Cited

U.S. PATENT DOCUMENTS

| RE18,122 E | 7/1931 | Flettner |
| 1,840,594 A * | 1/1932 | Minor ..................... B64C 23/08 244/200 |
| 2,261,558 A * | 11/1941 | Orloff ..................... B64C 21/02 114/67 R |
| 6,622,973 B2 | 9/2003 | Al-Garni et al. |

(Continued)

OTHER PUBLICATIONS

International Search Report.

*Primary Examiner* — Igor Kershteyn
*Assistant Examiner* — Brian P Wolcott
(74) *Attorney, Agent, or Firm* — Fay Sharpe LLP

(57) ABSTRACT

A fluid interface device, such as an airfoil assembly, can include a device structure and at least one moveable band oriented such that the band moves in a direction of fluid flow. The at least one moveable band can be supported on the device structure such that an outer surface of the moveable band is exposed along the device structure and is capable of movement relative thereto such that a relative velocity can be maintained between the outer surface and the device structure. The fluid interface device can have a cross section that includes first and second boundary layer collision points disposed along one side of the device structure with at least one of said first and second boundary layer collision points formed by the endless band. An airplane, a wind turbine and a method are also included.

20 Claims, 10 Drawing Sheets

(56) References Cited

U.S. PATENT DOCUMENTS

| | | | |
|---|---|---|---|
| 6,824,109 B2 * | 11/2004 | Garver | B64C 23/02 244/130 |
| 7,278,825 B2 | 10/2007 | Segota et al. | |
| 2009/0148290 A1 | 6/2009 | Garver | |

* cited by examiner

FLUID INTERFACE DEVICE AND METHOD

BACKGROUND

The subject matter of the present disclosure broadly relates to the art of fluid interface devices, such as airfoil structures, for example, use in connection with the relative movement of fluid, and, more particularly, to a fluid interface device that includes a plurality of boundary layer collision points disposed therealong.

The subject matter of the present disclosure finds particular application and use in connection with airfoil structures, such as wings of aircraft and blades of wind turbines, and is shown and described herein with particular reference thereto. It will be appreciated, however, that the subject matter of the present disclosure is amenable to use in a variety of other applications and/or environments, such as air moving devices (e.g., fans) and other power generation systems (e.g., turbines), for example. As such, it is to be understood that the specific reference herein to use on and/or in association with aircraft wings and wind turbines is merely exemplary of such use and is not intended to be in any way limiting.

The use of fluid interface devices, such as aircraft wings and wind turbine blades, for example, to convert forces imparted by fluid flowing along or across a fluid interface device into forces useful for performing work are well known. Nonetheless, efforts to improve the performance of such fluid interface devices continue to be made. One example of such an effort relates to a construction for improving the performance of aircraft, and is disclosed in U.S. Pat. No. 6,824,109 to Garver. Another example of such an effort relates to a construction for improving the performance of wind turbines, and is disclosed in U.S. Patent Application Publication 2009/0148290 to Garver.

Notwithstanding the prior development and overall success of the aforementioned constructions, it is believed desirable to continue to develop fluid interface devices, such as an airfoil structure for an airplane or a wind turbine, for example, and method of assembly that further advance the art of known fluid interface devices.

INCORPORATION BY REFERENCE

The entire contents of the following documents are hereby incorporated herein by reference:

U.S. Pat. No. 6,824,109, which issued on Nov. 30, 2004, entitled LIFT ADJUSTING DEVICE FOR AIRCRAFT by Garver; and, U.S. Patent Application Publication No. 2009/0148290, which was filed as U.S. Ser. No. 12/372,371 on Feb. 17, 2009 and published on Jun. 11, 2009, entitled WIND TURBINE AND METHOD OF OPERATING SAME by Garver.

BRIEF DESCRIPTION

One example of a fluid interface device in accordance with the subject matter of the present disclosure can include a device structure for use in a fluid such that relative movement between the fluid interface device and the fluid can result in a fluid flow across the fluid interface device such that the fluid flow can have a flow direction. The fluid interface device can also include at least one moveable band oriented such that the band moves in the flow direction. The at least one moveable band supported on the device structure such that a first outer surface of the at least one moveable band is exposed along the device structure and is capable of movement relative thereto such that a relative velocity can be maintained between the first outer surface and the device structure. The fluid interface device can have a cross section that includes first and second boundary layer collision points disposed along one side of the device structure with at least one of said first and second boundary layer collision points formed by the endless band.

One example of an airfoil assembly in accordance with the subject matter of the present disclosure, which can be suitable for use in a gaseous fluid such that relative movement between the airfoil assembly and the gaseous fluid can result in a gaseous fluid flow across the airfoil assembly that has a flow direction, can include an airfoil structure and an endless band. The airfoil structure can have a longitudinal length and can include a first longitudinal edge, a second longitudinal edge spaced laterally from the first longitudinal edge, a first side extending longitudinally along at least a portion of the length between the first and second longitudinal edges, and a second side extending longitudinally along at least a portion of the length between the first and second longitudinal edges and generally opposite the first side. The endless band can include a first outer surface and a first band width. The endless band can be oriented such that the first band width extends longitudinally along the airfoil structure. The endless band can be supported on the airfoil structure such that the first outer surface is exposed along at least a portion of at least one of the first and second sides of the airfoil structure and such that the endless band is capable of lateral movement along the at least one of the first and second sides such that a relative velocity can be maintained between the first outer surface and the at least one of the first and second sides of the airfoil structure. The airfoil assembly can have a cross section that includes first and second boundary layer collision points disposed along the one of the first and second sides of the airfoil structure with at least one of the first and second boundary layer collision points formed by the endless band.

One example of an airplane in accordance with the subject matter of the present disclosure can include such an airfoil assembly.

One example of a wind turbine in accordance with the subject matter of the present disclosure can include such an airfoil assembly.

One example of a method of assembling an airfoil assembly in accordance with the subject matter of the present disclosure can include providing an airfoil structure that has a longitudinal length and that includes a first longitudinal edge, a second longitudinal edge spaced laterally from the first longitudinal edge, a first side extending longitudinally along at least a portion of the length between the first and second longitudinal edges, and a second side extending longitudinally along at least a portion of the length between the first and second longitudinal edges and generally opposite the first side. The method can also include providing an endless band including a first outer surface and a first band width. The method can further include orienting the endless band such that the first band width extends longitudinally along the airfoil structure and supporting the endless band on the airfoil structure such that the first outer surface is exposed along at least a portion of at least one of the first and second sides of the airfoil structure and is capable of lateral movement along the at least one of the first and second sides such that a relative velocity can be maintained between the first outer surface and the at least one of the first and second sides of the airfoil structure. The method can also include deflecting the endless band outwardly beyond the one of the first and second sides of the airfoil assembly at a first position spaced laterally from the first longitudinal edge such that a cross section of the airfoil assembly includes first and second boundary layer collision points disposed along the one of the first and second sides of the airfoil structure with at least one of the first and second boundary layer collision points formed by the endless band.

DETAILED DESCRIPTION

Referring now in greater detail to the drawings, it is to be understood that the illustrations reference herein are for the purposes of demonstrating examples of embodiments of the subject matter of the present disclosure and that these illustrations and examples are not intended to be in any way limiting. Additionally, it should be recognized and appreciated that the drawings are not to scale and that the proportion of certain features and/or elements may be exaggerated for purposes of clarity and ease of understanding.

A fluid interface device in accordance with the subject matter of the present disclosure is generally adapted for use in association with fluid such that relative movement between the fluid interface device and the fluid can result in a fluid flow across the fluid interface device. In general, the fluid flow will have a flow direction in relation to this relative movement and can cause a net force (e.g., lift) to act on the fluid interface device in a direction transverse (e.g., perpendicular) to the flow direction. One example of a fluid interface device that can be used in connection with the present concept is an airfoil. Typically, an airfoil has opposing sides that, in cross section, have different lateral lengths that can act to generate the net force acting on the airfoil, such as is commonly found on aircraft, aerial vehicles, wind turbines and a variety of other structures and devices.

Figure 1:
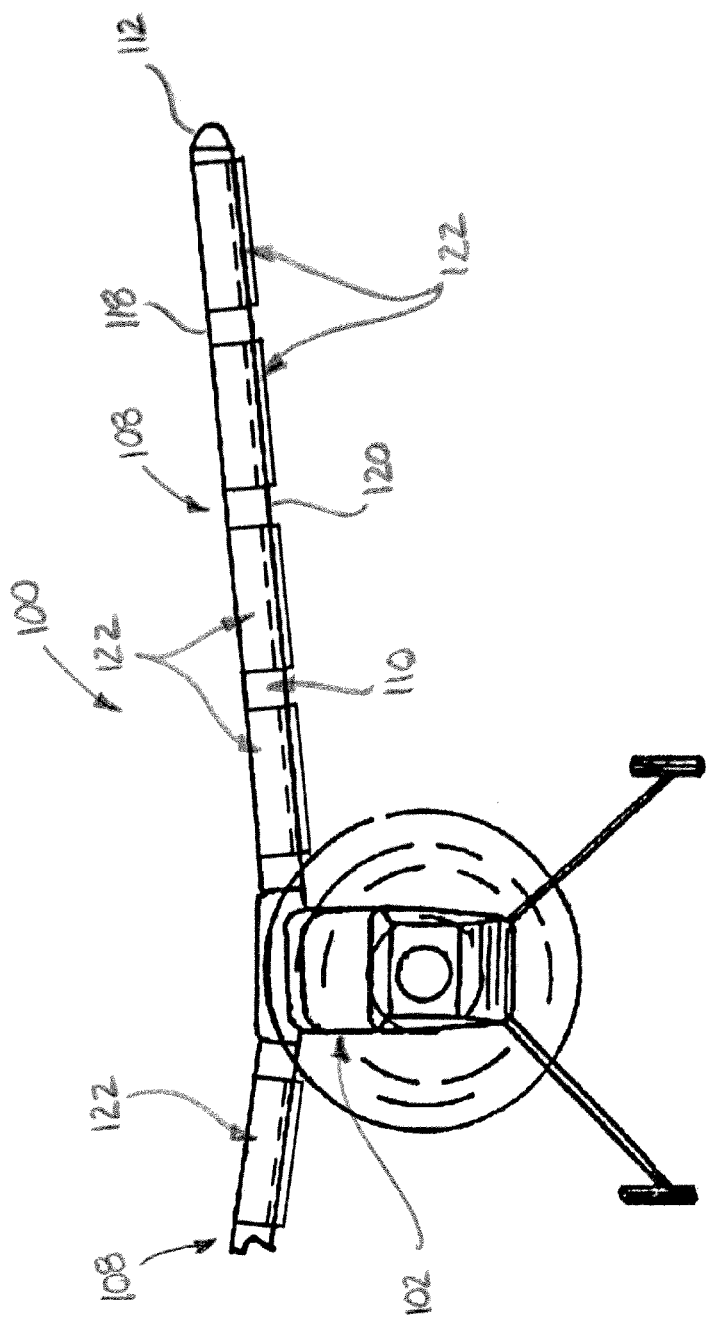
FIG. 1 is a front view of an airplane that includes a fixed wing with a plurality of moving bands that have a plurality of boundary layer collision points in accordance with the subject matter of the present disclosure.
Figure 2:
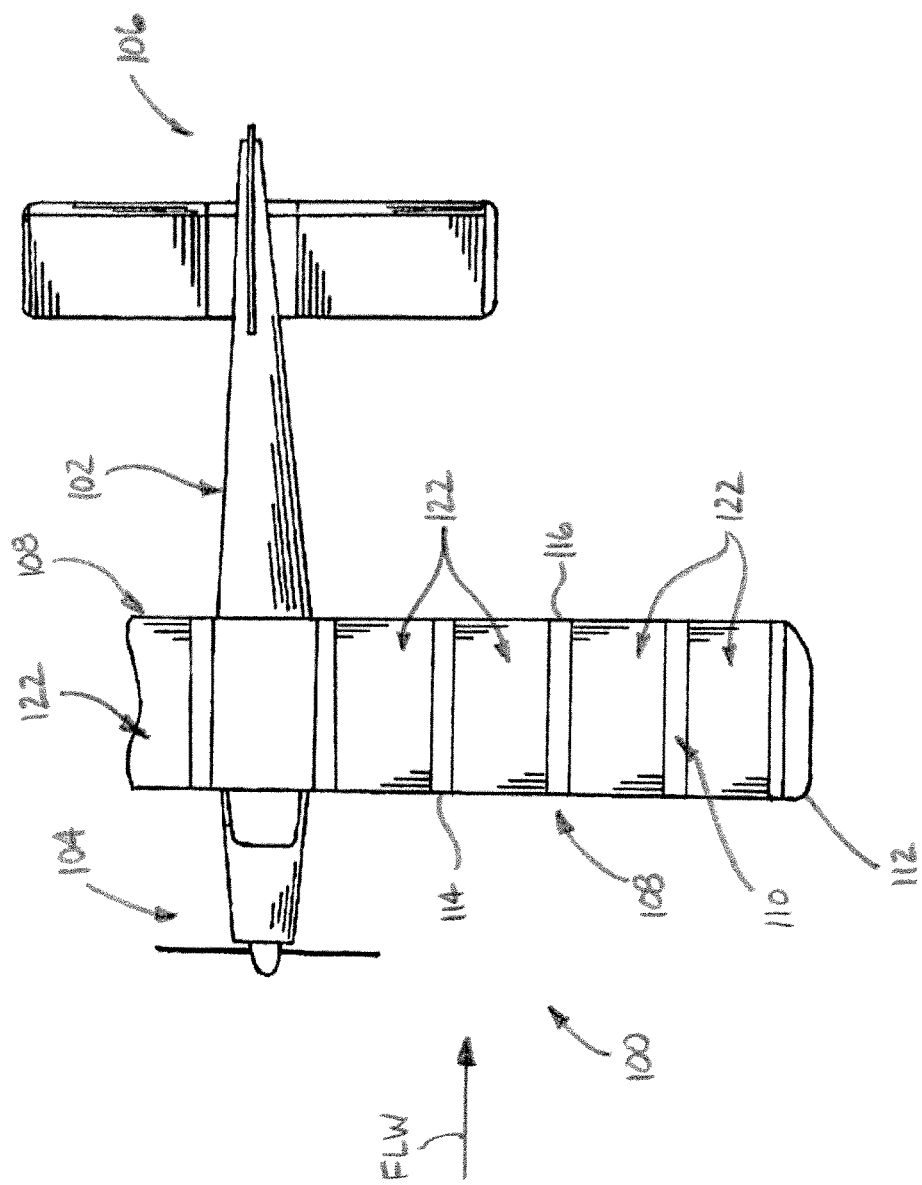
FIG. 2 is a top view of the airplane in FIG. 1.
Figure 3:
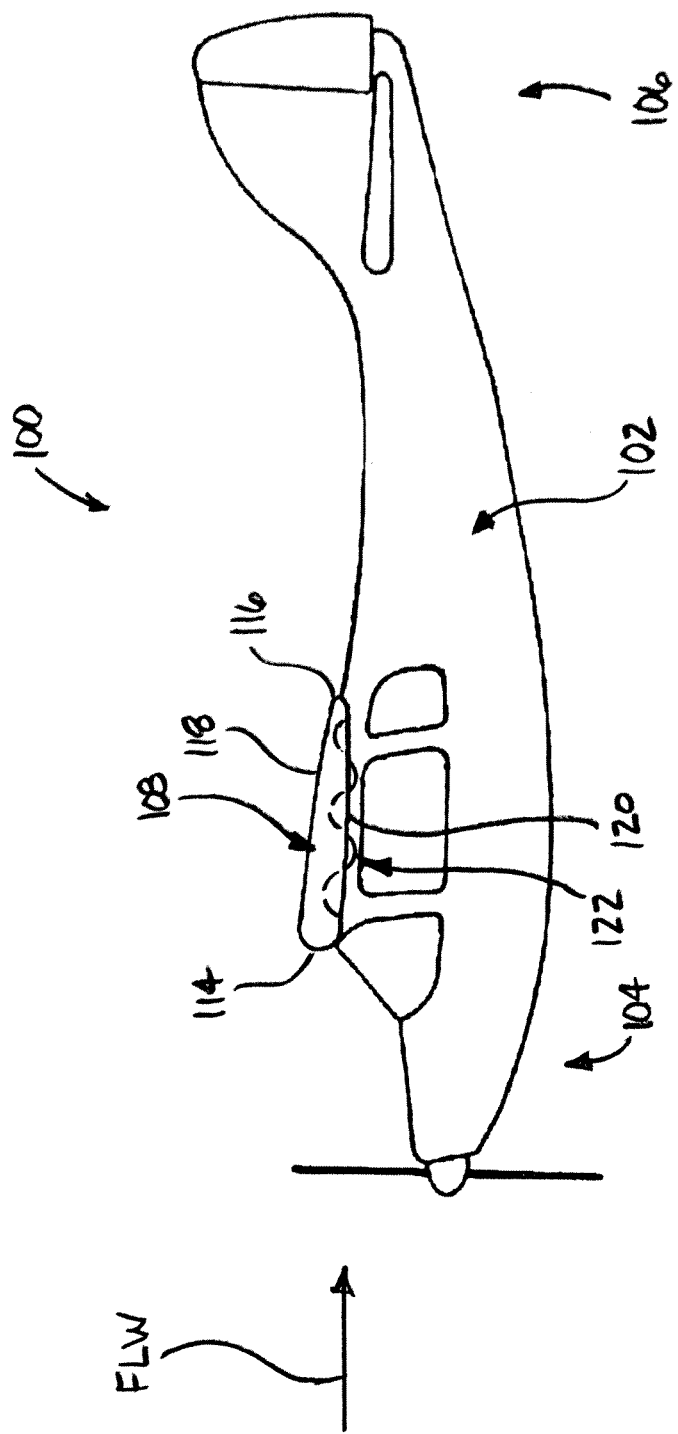
FIG. 3 is a side view of the airplane in FIGS. 1 and 2.

One example of a fluid interface device in accordance with the subject matter of the present disclosure is embodied in an airplane 100, which is illustrated in FIGS. 1-3. Airplane 100 includes a body or fuselage 102 that extends between a front 104 and a rear 106. Additionally, airplane 100 includes at least one airfoil assembly that is adapted for use in a gaseous fluid such that relative movement between the airfoil assembly and the gaseous fluid can result in a gaseous fluid flow across the airfoil assembly and thereby cause a net force (e.g., lift) to act on the airfoil assembly. In the case of airplane 100, the at least one airfoil assembly takes the form of two wing sections 108. The wing sections include a wing structure 110, and have a longitudinal length and extend lengthwise in opposing directions from along body 102 toward wing tips 112. Wing sections 108 have a first or leading edge 114 and a second or trailing edge 116 that is spaced laterally from the first edge. Wing sections 108 also include opposing first and second sides 118 and 120, respectively, which extend laterally between the leading and trailing edges of the wing sections. In cross section, first side 116 will normally have a longer lateral length than second side 118. As is well understood, such a cross-sectional shape will result in a net lifting force being generated along the wing sections as the wing sections undergo relative movement with a gaseous fluid, which movement is represented in FIGS. 2 and 3 by arrow FLW.

It will be appreciated that wing sections 108 can be secured to the body in any suitable manner. As such, it will be understood that the airplane and wing configuration illustrated in FIGS. 1-3 is merely one example of a possible configuration and is not intended to be in any way limiting.

An airfoil assembly in accordance with the subject matter of the present disclosure can also include one or more surfaces that are capable of moving laterally along at least a portion of at least one of the sides of the airfoil assembly. It will be appreciated that any suitable number of movable surfaces can be used, such as a quantity of from 1 to 50 moving surfaces, for example, depending upon the size and shape of the airfoil assembly. Additionally, the one or moveable surfaces can take any suitable form or configuration. As one example, the one or more moving surfaces could take the form of one or more endless bands that are supported on or along the airfoil assembly. Furthermore, an airfoil assembly in accordance with the subject matter of the present disclosure can include a plurality of boundary layer collision points that are disposed in spaced relation to one another in the direction of fluid flow. In some cases, one or more of the surfaces (e.g., one or more of the endless bands) can form one or more of the plurality of boundary layer collision points. It will be appreciated that any suitable number of boundary layer collision points could be included depending upon the size and shape of the airfoil, such as a quantity of from 2 to 15 boundary layer collision points, for example.

In the exemplary arrangement shown in FIGS. 1-3, airplane 100 is shown as including a plurality of endless bands 122 disposed in spaced relation to one another along the longitudinal length of wing sections 108. Additionally, wing sections 108 can include a plurality of boundary layer collision points formed therealong. In a preferred arrangement, the two or more of the plurality of boundary layer collision points are positioned in approximate alignment with one another in the longitudinal direction (e.g., in the direction from body 102 toward wing tip 112) but in spaced relation to one another in the lateral direction (e.g. in the direction from leading edge 114 toward trailing edge 116). In such case, at least one of the two or more boundary layer collision points can be formed from one of endless bands 122. In a preferred arrangement, at least one boundary layer collision point is formed by each of a plurality of endless bands disposed longitudinally along wing sections 108.

Figure 4:
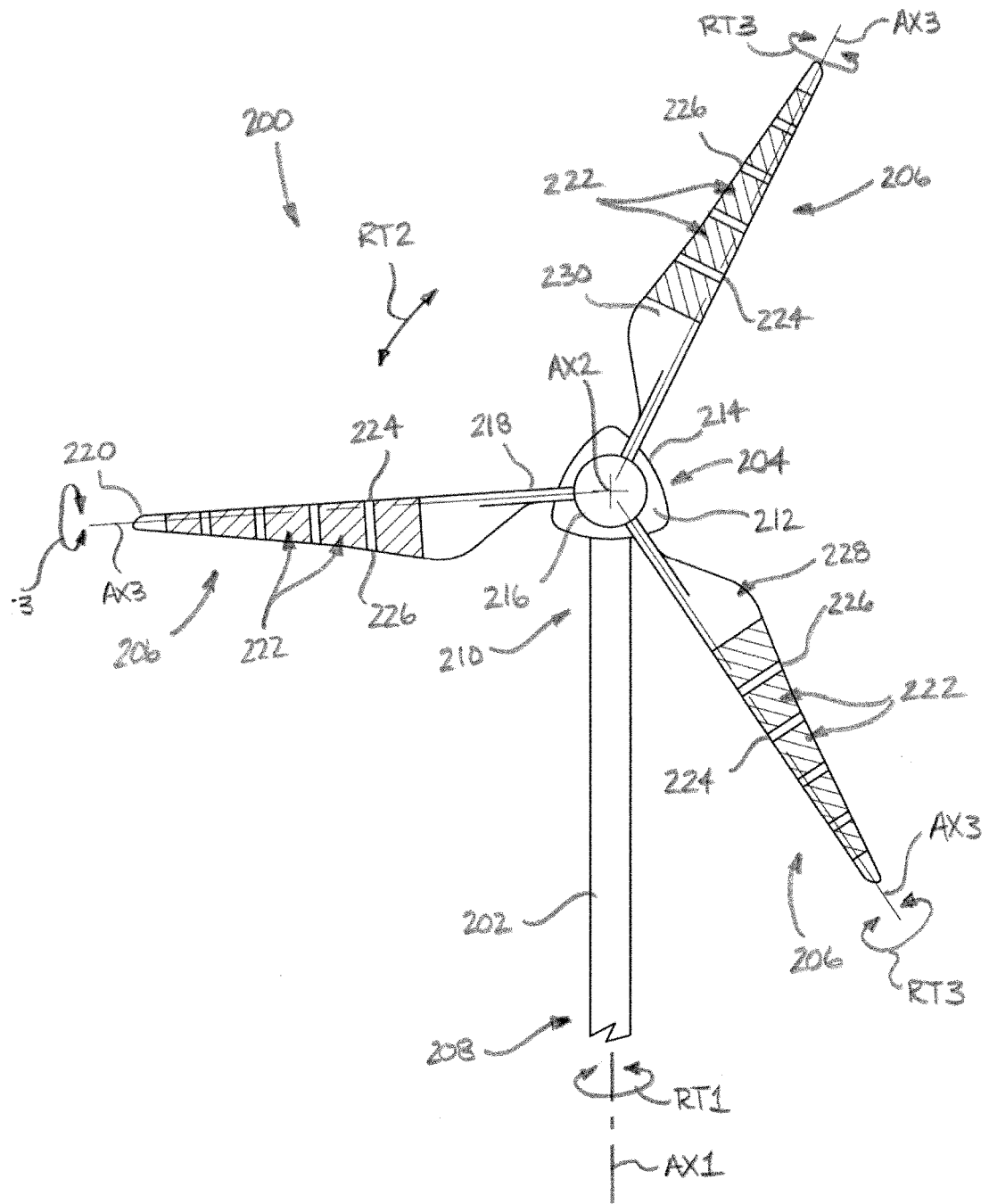
FIG. 4 is a front view of a wind turbine that includes a plurality of blades and a plurality of moving bands with a plurality of boundary layer collision points in accordance with the subject matter of the present disclosure.

Another example of a fluid interface device in accordance with the subject matter of the present disclosure is embodied in a wind turbine 200, which is illustrated in FIG. 4. Wind turbine 200 includes a support or base structure 202, a turbine body 204 that is supported on the base structure, and at least one turbine blade assembly that is operatively connected to the turbine body. In the exemplary embodiment shown in FIG. 5, a plurality of turbine blade assemblies 206 is shown as being operatively connected to turbine body 204. It will be appreciated that any suitable number of turbine blade assemblies can be supported on the turbine body, such as from one (1) to nine (9) turbine blade assemblies, for example.

Support or base structure 202 is shown in as having an approximately-straight configuration extending longitudinally between a first or lower end 208 and a second or upper end 210. It will be appreciated that the base structure can be of any type, kind, configuration and/or construction suitable for supporting turbine body 204 and the one or more turbine blade assemblies at a suitable elevation above a supporting foundation (not shown), and that base structure 202 is merely one example of a base structure that could be used. Additionally, it will be appreciated that a wind turbine in accordance with the subject disclosure can be installed at any suitable geographic location. As such, the supporting foundation could, without limitation, be a solid foundation supported by the ground, a floating structure on a body of water or even a rooftop (or other elevated portion) of a building or other structure.

Figure 5:
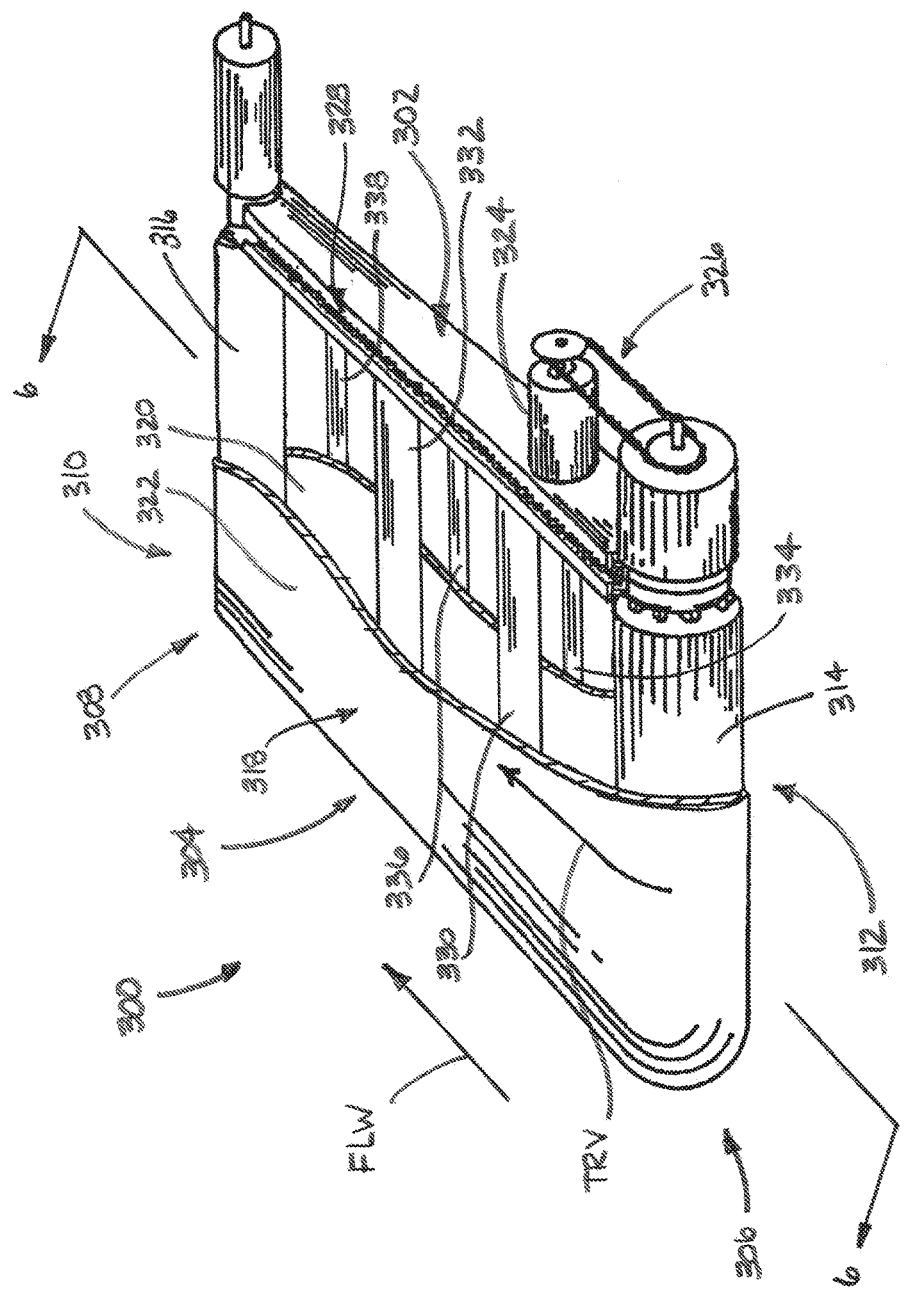
FIG. 5 is a cut away perspective view of one exemplary embodiment of a portion of an airfoil assembly having a moving band and drive assembly in accordance with the subject matter of the present disclosure.

Base structure 202 is shown in as including a longitudinally-extending axis AX1 extending between the first and second ends thereof. Turbine body 204 is shown as being supported on second end 210 and, in a preferred arrangement, is operatively connected to base structure 202 such that the turbine body can be rotated about axis AX1, as is represented in FIG. 5 by arrow RT1. In this manner, the turbine body and the one or more turbine blade assemblies supported thereon can be favorably oriented with respect to the direction of the wind. It will be recognized that the favorable orientation of a turbine body and one or more turbine blade assemblies of a wind turbine is generally well understood in the art and that any suitable arrangement and/or system can be used to control the orientation of the turbine body and one or more turbine blade assemblies about axis AX1.

Turbine body 204 includes a first or front end 212, a second or tail end (not shown) and a longitudinal axis AX2 that extends generally between the front and tail ends (i.e., in a direction into the drawing sheet). Turbine body 204 can be oriented in a lengthwise-direction with respect to the wind direction, which will generally have a direction into the drawing sheet, such that front end 212 and turbine blade assemblies 206 are facing in an upstream direction and the tail end (not shown) of the turbine body is disposed in a downstream direction. It will be appreciated, however, that other configurations and/or constructions of wind turbines may operate in a different manner.

Turbine body 204 also includes a first body portion 214 that is supported on the base structure for rotation about axis AX1, as described above, and a second body portion 216 that is supported on the first body portion for rotation about axis AX2. It will be appreciated that second body portion 216 can be supported on first body portion 214 in any suitable manner, such as may be known by those of skill in the art.

A plurality of turbine blade assemblies 206 are operatively connected to second body portion 216 of turbine body 204 for rotation therewith about axis AX2. In general, kinetic energy from air currents (i.e., wind) acting on turbine blade assemblies 206 cause the turbine blade assemblies to impart rotational motion to second body portion 216 of the turbine body. As such, the turbine blade assemblies together with the second body portion of the turbine body rotate about axis AX2, as indicated by arrow RT2.

Additionally, turbine blade assemblies 206 extend radially-outwardly from second body portion 216 between a first or proximal end 218 and a second or distal end 220. A longitudinal axis AX3 extends generally between the proximal and distal ends. In one preferred embodiment, the turbine blade assemblies can be supported on second body portion 216 for rotation about axes AX3, respectively of each turbine blade assembly, as is generally indicated by arrows RT3. Rotation of the turbine blade assemblies about axes AX3 permits favorable orientation of the turbine blade assemblies with respect to the direction of the wind, as is well understood by those of skill in the art. Additionally, it will be appreciated that any suitable arrangement and/or control system can be used to selectively adjust the orientation of the turbine blade assemblies about axes AX3.

As described above, an airfoil assembly in accordance with the subject matter of the present disclosure can also include one or more surfaces that are capable of moving laterally along at least a portion of at least one of the sides of the airfoil assembly. It will be appreciated that any suitable number of movable surfaces can be used, such as a quantity of from 1 to 50 moving surfaces, for example, depending upon the size and shape of the airfoil assembly. Additionally, the one or moveable surfaces can take any suitable form or configuration. As one example, the one or more moving surfaces could take the form of one or more endless bands that are supported on or along the airfoil assembly. Furthermore, an airfoil assembly in accordance with the subject matter of the present disclosure can include a plurality of boundary layer collision points that are disposed in spaced relation to one another in the direction of fluid flow. In some cases, one or more of the surfaces (e.g., one or more of the endless bands) can form one or more of the plurality of boundary layer collision points. It will be appreciated that any suitable number of boundary layer collision points could be included depending upon the size and shape of the airfoil, such as a quantity of from 2 to 15 boundary layer collision points, for example.

In the exemplary arrangement shown in FIG. 4, wind turbine 200 is shown as including a plurality of endless bands 222 disposed in spaced relation to one another along the longitudinal length of turbine blade assemblies 206. Additionally, turbine blade assemblies 206 can include a plurality of boundary layer collision points formed therealong. In a preferred arrangement, the two or more of the plurality of boundary layer collision points are positioned in approximate alignment with one another in the longitudinal direction (e.g., in the direction from proximal end 218 toward distal end 220) but in spaced relation to one another in the lateral direction (e.g. in the direction from a leading edge 224 toward a trailing edge 226). In such case, at least one of the two or more boundary layer collision points can be formed from one of endless bands 222. In a preferred arrangement, at least one boundary layer collision point is formed by each of a plurality of endless bands disposed longitudinally along turbine blade assemblies 206.

With further reference to FIG. 4, turbine blade assemblies 206 can include a turbine blade structure and at least one surface that is disposed along at least one side of the turbine blade and is moveable relative to the side of the turbine blade structure such that the relative speed of the moveable surface with respect to the wind is different than the relative speed along the side of the turbine blade structure would be at that same longitudinal location. In FIG. 4, turbine blade assemblies 206 include a turbine blade structure 228 and at least one surface (e.g., outer surfaces of endless bands 222) that extends along at least one side of the turbine blade structure and is moveable in a direction along that at least one side that is transverse (e.g., perpendicular) to longitudinal axis AX3.

It will be appreciated that an airfoil in accordance with the subject matter of the present disclosure, such as wing sections 108 and/or turbine blade assemblies 206, for example, can have any suitable shape or configuration. For example, as shown in FIG. 4, first or leading edge 224 extends longitudinally along the turbine blade structure and second or trailing edge 226 that extends longitudinally along the turbine blade structure in laterally-spaced relation to the leading edge. Trailing edge 226 is shown as being disposed at an angle relative to leading edge 224, such a portion of the turbine blade nearer to distal end 220 will have a lesser lateral dimension than a portion of the turbine blade nearer to proximal end 218. As one example, such an arrangement could be due to the turbine blade structure (or wing structure) being tapered in the lateral direction or, as another example, due to the turbine blade structure being twisted along the longitudinal length thereof.

Turbine blade structure 228 also includes a first side 230 and an opposing second side (not shown) that extend laterally between the leading and trailing edges of the turbine blade structure. Depending upon factors such as the shape of the turbine blade assembly, the direction of rotation of the turbine blade assembly about axis AX2 and the angle at which the turbine blade assembly is disposed about axis AX3, one of the first and second sides of the turbine blade may be referred to as a pressure side with the other of the first and second sides being referred to as the suction side of the turbine blade assembly.

It will be appreciated that each of the plurality of endless bands described above (e.g., endless bands 122 and 222) can have one of two or more different widths, lengths and/or shapes, such as may be due, at least in part, to the shape and/or configuration of associated airfoil structure. For example, two or more of the endless bands can have different nominal widths and/or lengths. In other cases, however, it will be appreciated that two or more of the plurality of endless bands can, optionally, have the same length and/or width dimensions.

It will be appreciated that the one or more movable surfaces disposed along an airfoil structure can be operatively secured thereto in any suitable manner. For example, if one or more endless bands are used to form the at least one moving surface, it will be appreciated that the one or more endless bands can be supported on the airfoil structure in any suitable manner and can include any suitable components and/or devices for permitting the one or more endless bands to be conveyed along at least one side of the airfoil structure. For example, one arrangement could utilize a first support element disposed toward the leading edge of the airfoil structure and a second support element disposed in laterally-spaced relation to the first support element toward in a direction toward the trailing edge of the airfoil structure. The one or more endless bands can then be supported between these laterally-spaced support elements.

A more specific example of an airfoil assembly 300, such as is representative of wing sections 108 and turbine blade assemblies 206, for example, is illustrated in FIG. 5 and includes an airfoil structure 302 and an endless band and drive assembly 304 that is operatively supported on the airfoil structure. Airfoil assembly 300 includes a first or leading edge 306, a second or trailing edge 308, a first side 310 and an opposing second side 312. A first roller 314 is disposed adjacent leading edge 306 and a second roller 316 is disposed adjacent trailing edge 308. An endless band 318 is operatively connected between the first and second rollers such that rotation of the rollers results in endless band 310 being conveyed or otherwise displaced along at least one of the first and second sides of the airfoil assembly. In the arrangement shown in FIG. 5, endless band 316 is displaced along both the first side and the second side of airfoil assembly 300.

Endless band 318 has an inner surface 320 disposed toward and abuttingly engaging rollers 314 and 316, and an outer surface 322 that interfaces with the fluid, which is indicated as moving relative to the airfoil assembly in direction represented by arrow FLW. Endless band 318 can be displaced relative to airfoil structure 302 in any suitable manner and through the use of any suitable configuration of component and/or systems. For example, first roller 314 is shown as being a primary or drive roller that is operatively connected to a rotational motion source, such as a motor 324, for example, in a suitable manner, such as by way of power transmission belt and pulley arrangement 326, for example. In some case, second roller 316 can be an unpowered or idler roller that rotates as a result of the movement of endless band 318, which is tensioned or otherwise operatively connected between the first and second rollers. A guide track 328 or other alignment maintaining arrangement can, optionally, be included to assist with tracking of the endless belt during displacement along the airfoil structure. During use, endless belt 316 can be displaced around and/or along airfoil structure 302 in the direction represented by arrow TRV. As such, it will be recognized that the outer surface of endless belt 316 is moves along first side 310 in the direction of fluid flow FLW and moves along second side 312 in the direction opposite fluid flow FLW.

Airfoil assembly 300 also includes a plurality of biasing elements that operatively interengage inner surface 320 and outer surface 322 of endless band 318. In the exemplary arrangement shown in FIGS. 5-7, the plurality of biasing elements include first and second inner rollers 330 and 332 as well as a first outer roller 334, a second outer roller 336 and a third outer roller 338. It will be appreciated that rollers 330-338 can be operatively supported on airfoil structure 302 using suitable bearing elements that permit the rollers to freely rotate in response to the motion of endless band 318. Alternately, one or more of the biasing elements could be stationary (i.e., non-rotating) elements along or across which the endless band can slide during movement.

Figure 6:
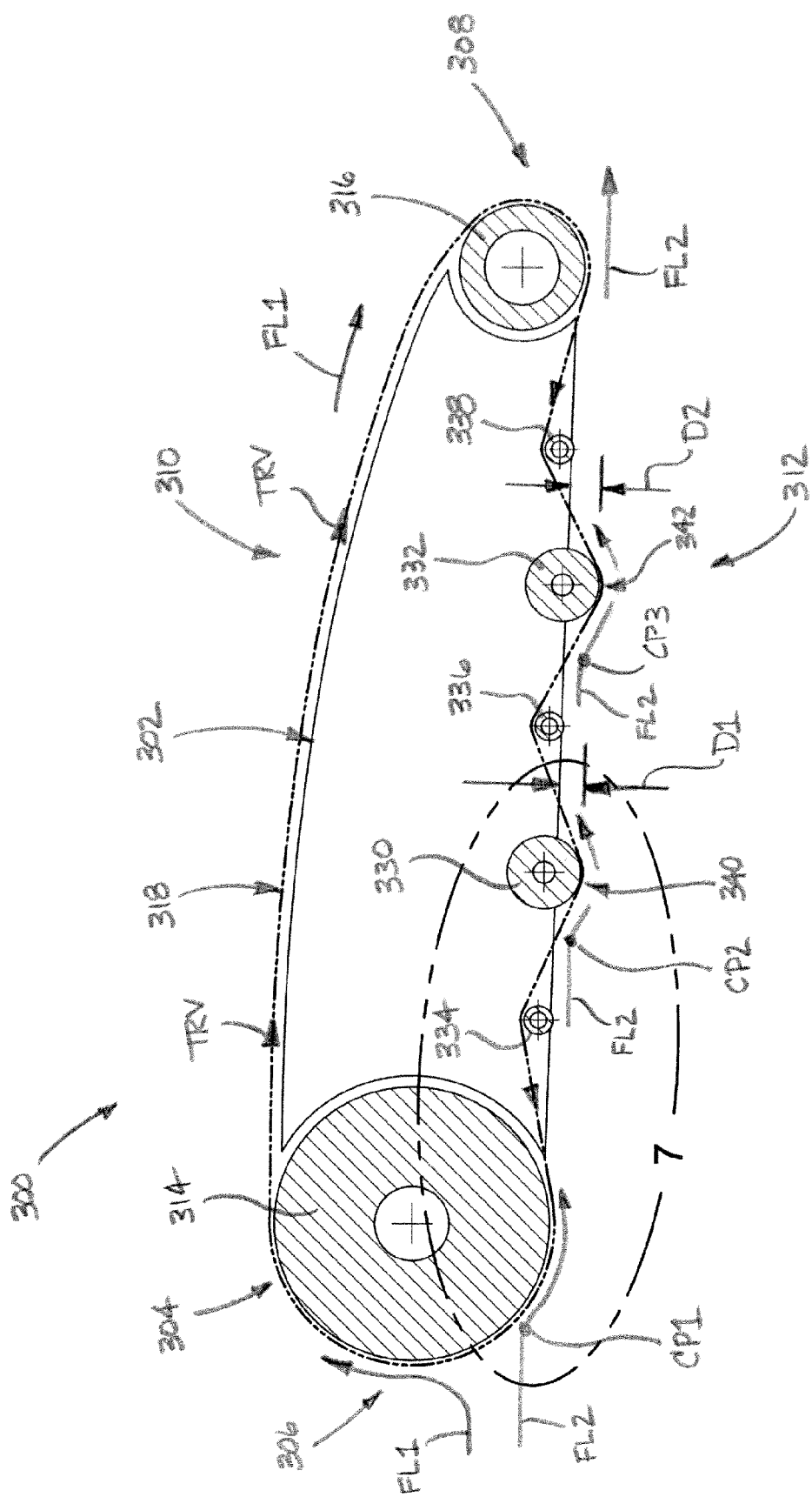
FIG. 6 is a schematic representation of a cross-sectional side view, taken from along line 6-6 in FIG. 5, of an airfoil assembly with a plurality of boundary layer collision points in accordance with the subject matter of the present disclosure.

As shown in FIG. 6, endless band 318 extends through and between inner and outer rollers 330-338 such that inner surface 320 of the endless band is in abutting engagement with inner rollers 330 and 332, and such that outer surface 322 of the endless band is in abutting engagement with outer rollers 334-338. Due to the relative position of inner rollers 330 and 332 relative to outer rollers 334-338, outer surface 322 (FIG. 5) of endless band 318 projects outwardly beyond airfoil structure 302. This results in the formation of fluid-engaging ribs 340 (FIG. 6) and 342 (FIG. 6) that extend along the longitudinal length of the airfoil assembly. The fluid-engaging ribs form boundary layer collision areas extending longitudinally across the endless band. When viewed in cross section, the fluid-engaging ribs form boundary layer collision points.

Figure 7:
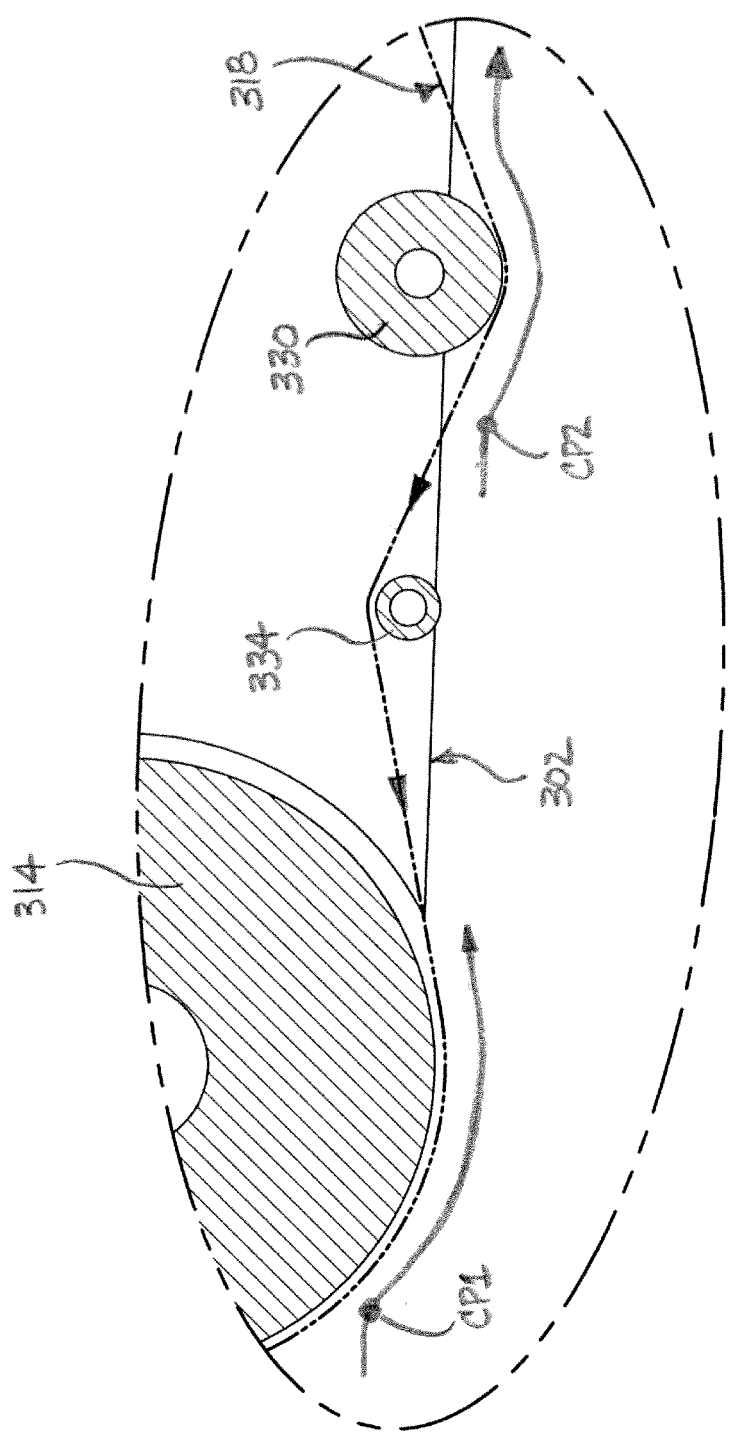
FIG. 7 is an enlarged view of the portion of the airfoil assembly identified in Detail 7 of FIG. 6.

As shown in FIGS. 6 and 7, a first boundary layer collision point CP1 can be formed along leading edge 306 of airfoil assembly 300, as the fluid flow contacts the leading edge of the airfoil assembly and is separated into fluid flows FL1 and FL2 that respectively travel along first side 310 and along second side 312 of the airfoil assembly. Fluid flow FL1 will travel along the first side in the same direction of travel as endless band 318, as is indicated by reference arrows TRV.

Fluid flow FL2 can travel along outer surface 322 (FIG. 5) of endless band 318 along second side 312 of the airfoil assembly and in a direction opposite the movement of the endless band, as is indicated by arrows TRV along second side 312. Depending upon the size, shape and configuration of the airfoil assembly as well as other factors, it is anticipated that at some point beyond first boundary layer collision point CP1, the boundary layer of fluid flow FL2 will separate from outer surface 322 and travel toward trailing edge 308. Upon reaching fluid-engaging rib 340, fluid flow FL2 will engage the rib and form a second boundary layer collision point CP2. Again, it is anticipated that at some point beyond the second boundary layer collision point, the boundary layer of fluid flow FL2 will separate from outer surface 322 and travel toward trailing edge 308. Upon reaching fluid-engaging rib 342, fluid flow FL2 will engage the rib and form a third boundary layer collision point CP3 prior to separating from the outer surface of the endless band and traveling to trailing edge 308.

The collision of fluid flow FL2 with each fluid-engaging rib creates an increased pressure along the rib that is expected to give impart a net force (e.g., lift) to the airfoil assembly of which the endless band is a part. It will be recognized and appreciated, however, that the desired amount of influence that may be imparted on an airfoil assembly by such is expected to vary from application-to-application based on a nearly limitless number of factors associated with the design, construction and use of the airfoil assembly. However, it is believed that such variations in the desired magnitude of influence that may be achieved can be controlled, at least in part, by the configuration and relative position of the fluid-engaging ribs formed along the airfoil assembly. As such, it will be recognized that first inner roller 330 is positioned or otherwise projects outwardly from airfoil structure 302 by a distance identified by reference dimension D1. Second inner roller 332 is positioned or otherwise projects outwardly from the airfoil structure by a distance identified by reference dimension D2, which is shown as being greater than reference dimension D1. As discussed below, however, it will be appreciated that other arrangements can alternately be used. Additionally, it is noted that in the exemplary arrangement illustrated in FIGS. 5-7, outer rollers 334-338 have a smaller cross-sectional size than that of inner rollers 330 and 332. It will be appreciated, however, that other arrangements could alternately be used.

It will be appreciated that the influence a given moving surface and/or the boundary layer collision points thereof may have on an airfoil assembly may vary depending upon the position of the moving surface along the longitudinal length of the airfoil assembly as well as other features and characteristics of the moving surface, such as the size and shape of the airfoil structure and/or the size and shape of the endless band that forms the moving surface, for example. As a result, it will be appreciated that it may be desirable to utilize boundary layer collision points that vary in lateral spacing and/or height (i.e., the distance the endless band projects outwardly from the airfoil structure. Accordingly, it is to be recognized and understood that the relative position of biasing elements can be varied from application-to-application to achieve a desired influence of the boundary layer collision points (e.g., CP1-CP3 in FIG. 6).

Figure 8:
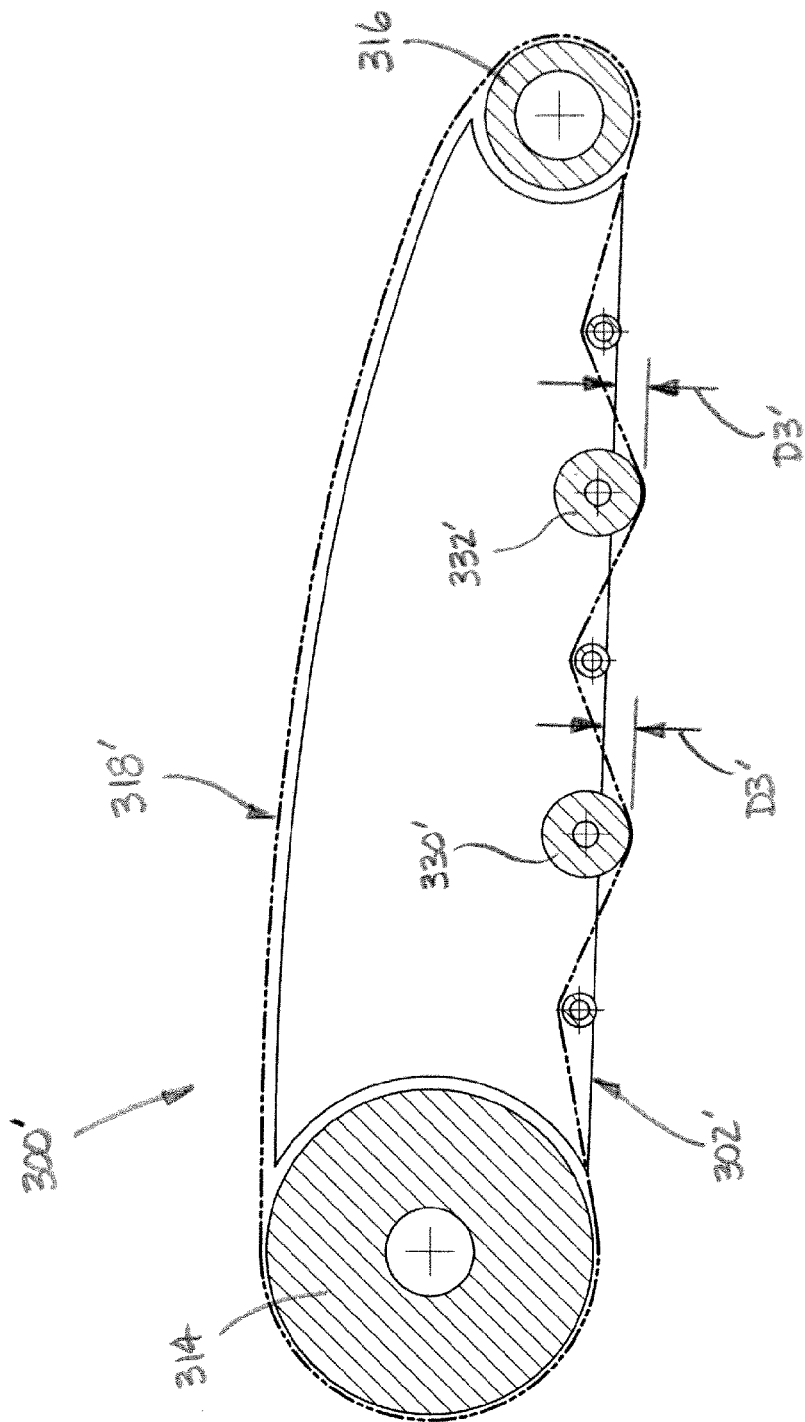
FIG. 8 is a schematic representation of a cross-sectional side view of an alternate configuration of the airfoil assembly illustrated in FIG. 6.

FIG. 8 illustrates one example of an airfoil assembly 300' that includes an airfoil structure 302' with an endless band 318' operatively connected between first and second rollers 314 and 316. Airfoil assembly 300' differs from airfoil assembly 300 shown and described in connection with FIGS. 5-7 in that inner rollers 330' and 332' are positioned or otherwise project outwardly from airfoil structure 302' approximately the same distance, which is represented in FIG. 8 by reference dimensions D3'.

Figure 9:
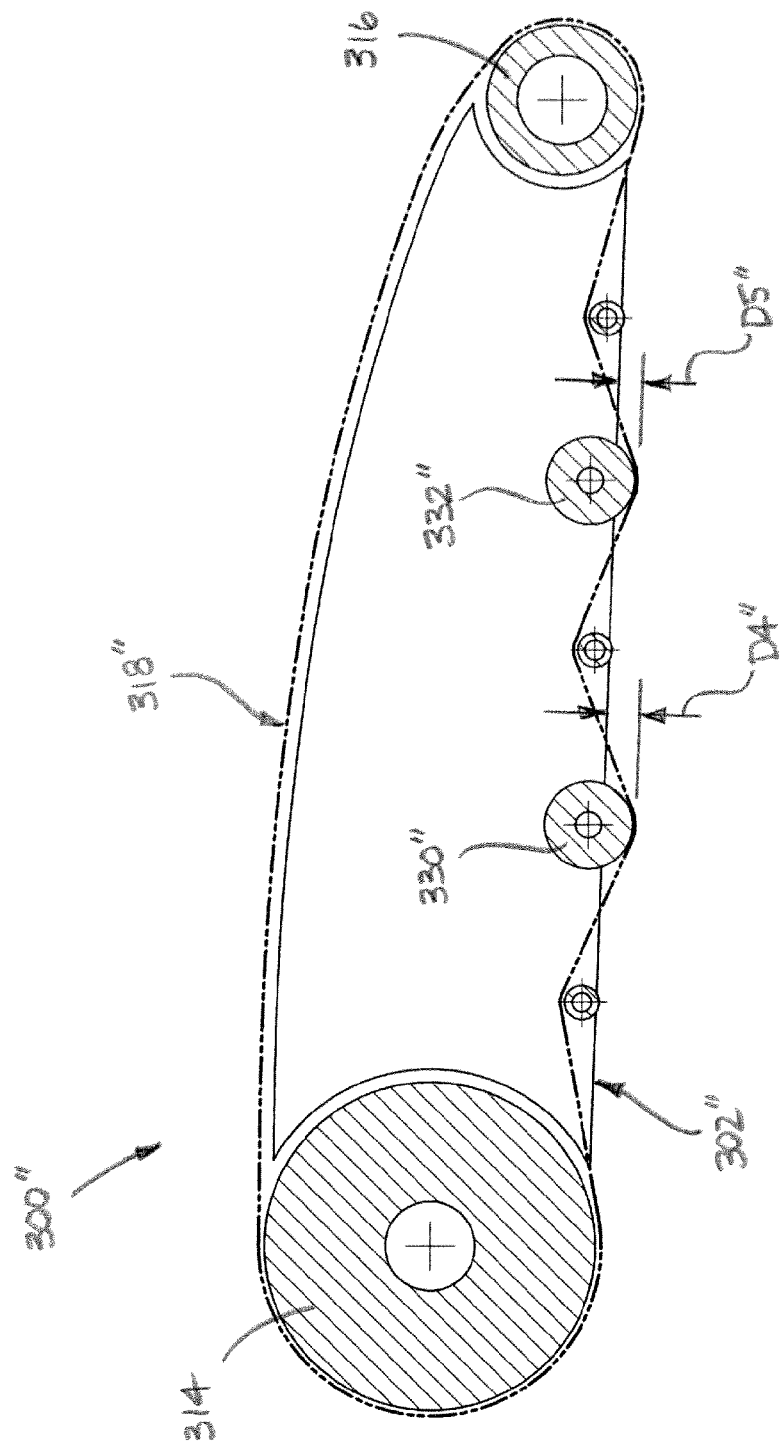
FIG. 9 is a schematic representation of a cross-sectional side view of another alternate configuration of the airfoil assembly illustrated in FIG. 6.

FIG. 9 illustrates another example of an airfoil assembly 300" that includes an airfoil structure 302" with an endless band 318" operatively connected between first and second rollers 314 and 316. Airfoil assembly 300" differs from airfoil assemblies 300 and 300', which are respectively shown and described in connection with FIGS. 5-7 and FIG. 8 in that first inner roller 330" is positioned or otherwise projects outwardly from airfoil structure 302" a greater distance than second inner roller 332", as is represented in FIG. 9 by reference dimensions D4" and D5".

The at least one moveable surface operatively disposed on or along an airfoil assembly, such as one of endless bands 122, 222 and/or 318, for example, can be formed from any suitable material or combination of materials, such as metal, plastic and/or fabric, for example. Metal material could include stainless steel sheet, for example. Plastic material could include any suitable polymeric film, such as polyester film, for example. Fabric material could include any suitable elastomeric or non-elastomeric, woven or non-woven material having one or more plies formed of filaments of one or more types and/or kinds of material, such as a stainless steel mesh, for example.

Figure 10:
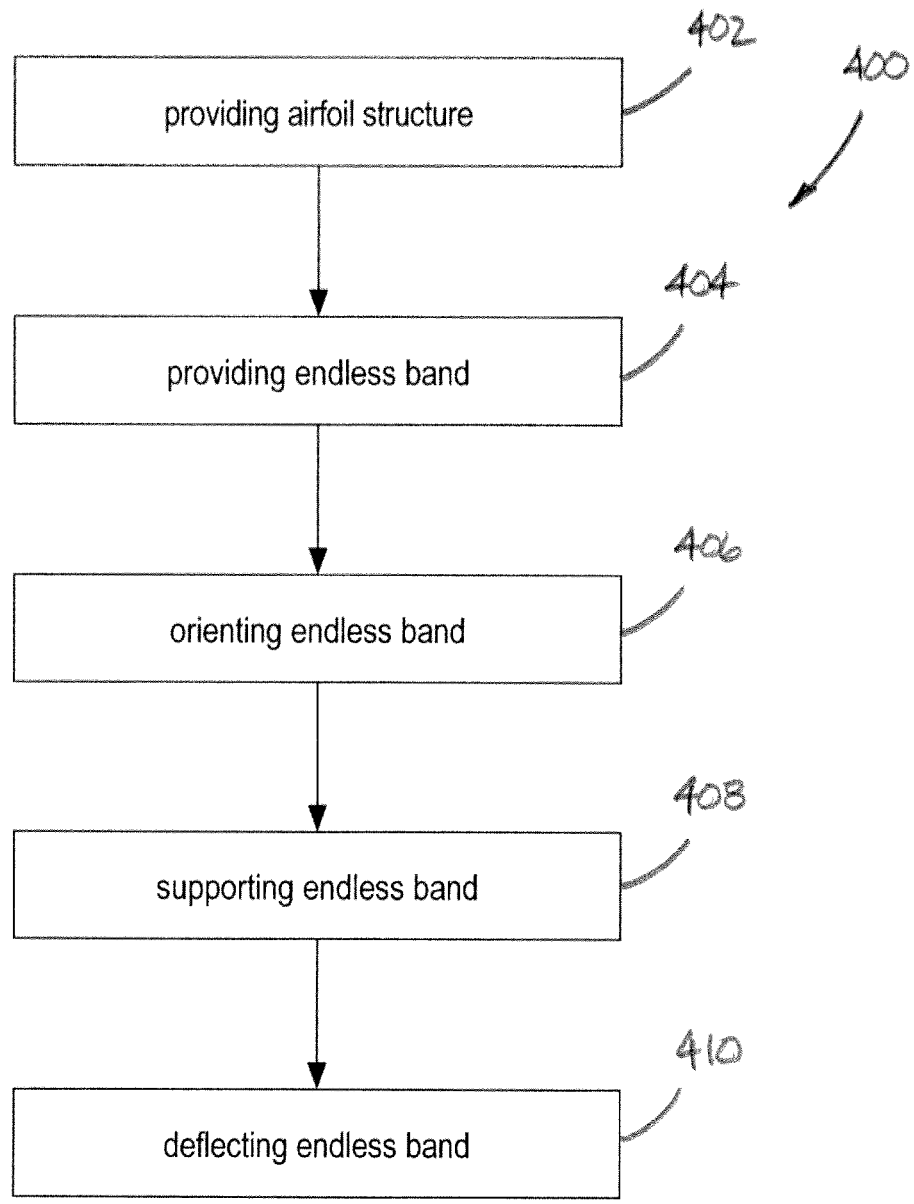
FIG. 10 is a graphical representation of one example of a method of assembling an airfoil assembly having a plurality of boundary layer collision points in accordance with the subject matter of the present disclosure.

With reference to FIG. 10, one example of a method 400 of assembling an airfoil assembly in accordance with the subject matter of the present disclosure is shown and can include providing an airfoil structure, such as one of a wing structure 110, a turbine blade structure 228 or an airfoil structure 302, for example, such as is represented in FIG. 10 by referenced number 402. Method 400 can also include providing an endless band, such as one of bands 122, 222 or 318, for example, such as is represented in FIG. 10 by reference number 404. The method can also include orienting the endless band such that a first band width extends longitudinally along the airfoil structure and supporting the endless band on the airfoil structure such that a first outer surface is exposed along at least a portion of at least one of the first and second sides of the airfoil structure, such as is represented in FIG. 10 by reference numbers 406 and 408, respectively. Method 400 can also include deflecting the endless band outwardly beyond the one of the first and second sides of the airfoil assembly such that a cross section of the airfoil assembly includes at least first and second boundary layer collision points CP1 and CP2, such as is represented in FIG. 10 by reference number 410.

It will be recognized that airfoils, such as airplane wings and turbine blades, for example, of a wide variety of different sizes, shapes, configurations and constructions have been developed, and that all such variations could not be shown and/or described in the subject disclosure. For example, airplane wings and turbine blades have been developed that include straight edges, tapered edges, curved edges, approximately planar sides, curved sides, symmetrically-shaped sides and asymmetrically-shaped sides. Additionally, some turbine blades are twisted along the longitudinal length thereof such that the wind contacts the turbine blade at different angles at different points along the longitudinal extent of the turbine blade. Notwithstanding all of the many variations of turbine blades, it is to be understood that the subject matter of the present disclosure is broadly capable of use on or otherwise in association with airplane wings and turbine blades of any suitable type, kind, configuration and/or construction. As such, it is to be understood that the type, kind, size, shape, construction, configuration and/or arrangement of airplane wings and turbine blades shown and described herein are merely exemplary and not intended to be limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An airfoil assembly for use in an associated gaseous fluid such that relative movement between said airfoil assembly and the associated gaseous fluid can result in an associated gaseous fluid flow across said airfoil assembly that has an associated flow direction, said airfoil assembly comprising:
an airfoil structure having a longitudinal length and including a first longitudinal edge, a second longitudinal edge spaced laterally from said first longitudinal edge, a first side extending longitudinally along at least a portion of said length between said first and second longitudinal edges, and a second side extending longitudinally along at least a portion of said length between said first and second longitudinal edges and generally opposite said first side; and,
an endless band including a first outer surface and a first band width, said endless band oriented such that said first band width extends longitudinally along said airfoil structure, said endless band supported on said airfoil structure such that said first outer surface is exposed along at least a portion of at least one of said first and second sides of said airfoil structure and is capable of lateral movement along said at least one of said first and second sides such that relative movement from said second longitudinal edge toward said first longitudinal edge into the associated flow direction can be maintained between said first outer surface and said at least one of said first and second sides of said airfoil structure;
said airfoil assembly having a cross section that includes first and second boundary layer collision points disposed along one of said first and second sides of said airfoil structure with at least one of said first and second boundary layer collision points formed by said endless band and with a portion of said first outer surface of said endless band between said first and second boundary layer collision points disposed inwardly of said airfoil structure along said portion of said one of said first and second sides of said airfoil structure.

2. An airfoil assembly according to claim 1, wherein each of said first and second boundary layer collision points are formed from said endless band.

3. An airfoil assembly according to claim 1, wherein said second boundary layer collision point is formed by said endless band projecting outwardly beyond said one of said first and second sides of said airfoil structure.

4. An airfoil assembly according to claim 1, wherein said first boundary layer collision point is positioned adjacent said first longitudinal edge of said airfoil structure and said second boundary layer collision point is spaced laterally from said first boundary layer collision point in a direction toward said second longitudinal edge.

5. An airfoil assembly according to claim 4, wherein said airfoil assembly includes a third boundary layer collision point formed by said endless band and spaced laterally from said second boundary layer collision point in a direction toward said second longitudinal edge.

6. An airfoil assembly according to claim 5, wherein said third boundary layer collision point is formed by said endless band projecting outwardly beyond said one of said first and second sides of said airfoil structure.

7. An airfoil assembly according to claim 6, wherein said third boundary layer collision point projects outwardly beyond said one of said first and second sides a distance greater than said second boundary layer collision point.

8. An airfoil assembly according to claim 1, wherein said endless band is one of a plurality of endless bands spaced longitudinally along said airfoil structure.

9. An airfoil assembly according to claim 8, wherein said airfoil assembly includes a plurality of second boundary layer collision points disposed in longitudinally spaced relation to one another along said length of said airfoil structure with at least two of said plurality of endless bands each forming one of said plurality of second boundary layer collision point.

10. An airplane comprising an airfoil assembly according to claim 1.

11. An airplane according to claim 10, wherein said airfoil assembly is one of a plurality of airfoil assemblies forming wings of said airplane.

12. A wind turbine comprising an airfoil assembly according to claim 1.

13. A wind turbine according to claim 12, wherein said airfoil assembly is one of a plurality of airfoil assemblies forming blades of said wind turbine.

14. A method of assembling an airfoil assembly, said method comprising:
providing an airfoil structure having a longitudinal length and including a first longitudinal edge, a second longitudinal edge spaced laterally from said first longitudinal edge, a first side extending longitudinally along at least a portion of said length between said first and second longitudinal edges, and a second side extending longitudinally along at least a portion of said length between said first and second longitudinal edges and generally opposite said first side;
providing an endless band including a first outer surface and a first band width;
orienting said endless band such that said first band width extends longitudinally along said airfoil structure and supporting said endless band on said airfoil structure such that said first outer surface is exposed along at least a portion of at least one of said first and second sides of said airfoil structure and is capable of lateral movement along said at least one of said first and second sides such that relative movement from said second longitudinal edge toward said first longitudinal edge can be maintained between said first outer surface and said at least one of said first and second sides of said airfoil structure; and,
deflecting said endless band outwardly beyond said one of said first and second sides of said airfoil assembly at a first position spaced laterally from said first longitudinal edge such that a cross section of said airfoil assembly includes first and second boundary layer collision points disposed along one of said first and second sides of said airfoil structure with at least one of said first and second boundary layer collision points formed by said endless band and with a portion of said first outer surface of said endless band between said first and second boundary layer collision points disposed inwardly of said airfoil structure along said portion of said one of said first and second sides of said airfoil structure.

15. A method according to claim 14 further comprising deflecting said endless band outwardly beyond said one of said first and second sides of said airfoil assembly at a second position spaced laterally from said first position such that a cross section of said airfoil assembly includes a third boundary layer collision point disposed along said one of said first and second sides of said airfoil structure and formed by said endless band.

16. An airfoil assembly for use in an associated gaseous fluid such that relative movement between said airfoil assembly and the associated gaseous fluid can result in an associated gaseous fluid flow across said airfoil assembly with the associated gaseous fluid flow having an associated flow direction, said airfoil assembly comprising:
an airfoil structure having a longitudinal length and including a first longitudinal edge, a second longitudinal edge spaced laterally from said first longitudinal edge, a first side extending longitudinally along at least a portion of said length between said first and second longitudinal edges, and a second side extending longitudinally along at least a portion of said length between said first and second longitudinal edges generally opposite said first side; and,
a first edge roller disposed along said first longitudinal edge of said airfoil structure, said first edge roller having an axis of rotation oriented longitudinally and supported on said airfoil structure for rotation about said axis of rotation thereof;
a first inner roller having an axis of rotation oriented longitudinally and including an outside surface, said first inner roller supported on said airfoil structure for rotation about said axis of rotation thereof, said first inner roller disposed in laterally-spaced relation to said first edge roller in a direction toward said second longitudinal edge with at least a portion of said outside surface of said first inner roller projecting outwardly beyond said first side of said airfoil structure;
a first outer roller having an axis of rotation oriented longitudinally and including an outside surface, said first outer roller supported on said airfoil structure for rotation about said axis of rotation thereof, said first outer roller disposed laterally between said first edge roller and said first inner roller with at least a portion of said outside surface of said first outer roller disposed inwardly of said first side of said airfoil structure; and,
an endless band including a band outer surface, a band inner surface and a band width, said endless band oriented such that said band width extends longitudinally along said airfoil structure, said endless band supported on said airfoil structure such that said outer surface is exposed along at least said first side of said airfoil structure, said endless band being laterally displaceable along at least said first side of said airfoil structure such that a relative velocity can be maintained between said outer surface of said endless band and at least said first side of said airfoil structure;
said endless band extending along a band path in which said band inner surface is disposed along at least said first edge roller and at least a portion of said outside surface of said first inner roller projecting outwardly beyond said first side of said airfoil structure with said band outer surface disposed along at least a portion of said outside surface of said first outer roller disposed inwardly of said first side of said airfoil structure such that said endless band forms a first boundary layer collision point along said first edge roller and said endless band forms a second boundary layer collision point along said first inner roller.

17. An airfoil assembly according to claim 16 further comprising:
a second inner roller having an axis of rotation oriented longitudinally and including an outside surface, said second inner roller supported on said airfoil structure for rotation about said axis of rotation thereof, said second inner roller disposed in laterally-spaced relation to said first inner roller in a direction toward said second longitudinal edge with a portion of said outside surface of said second inner roller projecting outwardly beyond said outside surface of said first inner roller; and,
said endless band extending along said band path with said band inner surface disposed along a portion of said outside surface of said second inner roller such that said endless band forms a third boundary layer collision point along said second inner roller.

18. An airfoil assembly according to claim 17 further comprising:
- a second outer roller having an axis of rotation oriented longitudinally and including an outside surface, said second outer roller supported on said airfoil structure for rotation about said axis of rotation thereof, said second outer roller disposed laterally between said first inner roller and said second inner roller with a portion of said outside surface of said second outer roller disposed inwardly of said first side of said airfoil structure;
- said endless band extending along said band path with said band outer surface disposed along a portion of said outside surface of said second outer roller.

19. An airfoil assembly according to claim 16 wherein said endless band is one of a plurality of endless bands spaced longitudinally along said airfoil structure.

20. An airfoil assembly according to claim 16 wherein said endless band is displaced along said first side of said airfoil structure such that said band outer surface is displaced in a lateral direction from along said second longitudinal edge toward said first longitudinal edge.

\* \* \* \* \*